(12) United States Patent
Singh et al.

(10) Patent No.: US 12,130,826 B2
(45) Date of Patent: Oct. 29, 2024

(54) PARALLEL DATA STREAM PROCESSING SYSTEM

(71) Applicant: eBay Inc., San Jose, CA (US)

(72) Inventors: Gyanit Singh, Fremont, CA (US); Chi-Hsien Chiu, Milpitas, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/372,299

(22) Filed: Sep. 25, 2023

(65) Prior Publication Data

US 2024/0095253 A1 Mar. 21, 2024

Related U.S. Application Data

(63) Continuation of application No. 15/783,253, filed on Oct. 13, 2017, now Pat. No. 11,789,955, which is a continuation of application No. 13/034,555, filed on Feb. 24, 2011, now Pat. No. 9,805,101.

(60) Provisional application No. 61/308,877, filed on Feb. 26, 2010.

(51) Int. Cl.
 *G06F 16/00* (2019.01)
 *G06F 16/2458* (2019.01)

(52) U.S. Cl.
 CPC .................. *G06F 16/2465* (2019.01)

(58) Field of Classification Search
 CPC .................................................. G06F 16/2465
 See application file for complete search history.

(56) References Cited

U.S. PATENT DOCUMENTS

| | | |
|---|---|---|
| 6,021,403 A | 2/2000 | Horvitz et al. |
| 6,477,540 B1 | 11/2002 | Singh et al. |
| 6,502,091 B1 | 12/2002 | Chundi et al. |
| 6,507,834 B1 | 1/2003 | Kabra et al. |
| 6,732,084 B1 | 5/2004 | Kabra et al. |
| 7,143,091 B2 | 11/2006 | Charnock et al. |
| 7,152,073 B2 | 12/2006 | Gudbjartsson et al. |
| 7,249,117 B2 | 7/2007 | Estes |
| 7,467,047 B2 | 12/2008 | Vaidyanathan et al. |
| 7,590,620 B1 | 9/2009 | Pike et al. |
| 7,630,986 B1 | 12/2009 | Herz et al. |
| 7,650,331 B1 | 1/2010 | Dean et al. |
| 7,673,340 B1 | 3/2010 | Cohen et al. |
| 7,756,919 B1 | 7/2010 | Dean et al. |
| 7,890,549 B2 | 2/2011 | Elad et al. |

(Continued)

OTHER PUBLICATIONS

"Apache Hadoop", Retrieved from Internet URL: https://hadoop.apache.org/, Accessed on Dec. 23, 2021, 3 pages.

(Continued)

*Primary Examiner* — Tyler J Torgrimson
(74) *Attorney, Agent, or Firm* — FIG. 1 Patents

(57) ABSTRACT

A method and a system process a stream of data in parallel across a plurality of nodes. The log processing system has a log module, a query language module, and a query processing module. The log module receives and organizes the stream of data into a sequential and nested data structure. The query language operator module defines operators that operate on the sequential and nested data structure. The query processing module processes in parallel across a plurality of nodes a query based on an operator on the stream of data.

20 Claims, 7 Drawing Sheets

(56) References Cited

U.S. PATENT DOCUMENTS

| | | | |
|---|---|---|---|
| 7,996,352 B2* | 8/2011 | Jung | G06N 5/025 706/45 |
| 8,126,870 B2 | 2/2012 | Chowdhuri et al. | |
| 8,126,909 B2 | 2/2012 | Pike et al. | |
| 8,589,436 B2 | 11/2013 | Srinivasan et al. | |
| 9,063,979 B2 | 6/2015 | Chiu et al. | |
| 9,092,467 B2 | 7/2015 | Stolte et al. | |
| 9,305,238 B2 | 4/2016 | Srinivasan et al. | |
| 9,805,101 B2 | 10/2017 | Singh et al. | |
| 11,789,955 B2 | 10/2023 | Singh et al. | |
| 2003/0182310 A1 | 9/2003 | Chamrock et al. | |
| 2004/0003042 A1 | 1/2004 | Horvitz et al. | |
| 2004/0034652 A1 | 2/2004 | Hofmann et al. | |
| 2004/0153435 A1 | 8/2004 | Gudbjartsson et al. | |
| 2005/0038888 A1 | 2/2005 | Labertz | |
| 2005/0202391 A1 | 9/2005 | Allen et al. | |
| 2006/0218123 A1 | 9/2006 | Chowdhuri et al. | |
| 2006/0253418 A1 | 11/2006 | Charnock et al. | |
| 2006/0265406 A1 | 11/2006 | Chkodrov et al. | |
| 2007/0203693 A1 | 8/2007 | Estes | |
| 2008/0127068 A1 | 5/2008 | Meijer et al. | |
| 2008/0133891 A1* | 6/2008 | Salz | G06F 8/30 712/E9.016 |
| 2008/0301135 A1 | 12/2008 | Alves et al. | |
| 2009/0089078 A1* | 4/2009 | Bursey | G06Q 10/101 382/293 |
| 2009/0125550 A1* | 5/2009 | Barga | G06F 9/542 |
| 2009/0228474 A1 | 9/2009 | Chiu et al. | |
| 2009/0254971 A1 | 10/2009 | Herz et al. | |
| 2009/0300615 A1 | 12/2009 | Andrade et al. | |
| 2009/0313187 A1 | 12/2009 | Miller | |
| 2010/0122065 A1 | 5/2010 | Dean et al. | |
| 2010/0293196 A1 | 11/2010 | Roy et al. | |
| 2011/0137942 A1 | 6/2011 | Yan et al. | |
| 2011/0208730 A1* | 8/2011 | Jiang | G06F 16/9532 707/738 |
| 2011/0213802 A1 | 9/2011 | Singh et al. | |
| 2012/0036123 A1 | 2/2012 | Hasan et al. | |
| 2012/0215787 A1 | 8/2012 | Pike et al. | |
| 2012/0254193 A1 | 10/2012 | Chattopadhyay et al. | |
| 2012/0278323 A1 | 11/2012 | Chattopadhyay et al. | |
| 2018/0113916 A1 | 4/2018 | Singh et al. | |

OTHER PUBLICATIONS

"Event Series Intelligence: Esper & NEsper", Retrieved from Internet URL: https://web.archive.org/web/20150211185751/https://esper.codehaus.org:80/tutorials/tutorial/tutorial.html, Oct. 16, 2014, 4 pages.

"Scale Data Science across your Enterprise and Act in Real Time", Retrieved from Internet URL: https://www.tibco.com/data-science-and-streaming, 2021, 7 pages.

U.S. Appl. No. 13/034,555, , "Final Office Action received for U.S. Appl. No. 13/034,555, mailed on Jan. 26, 2015", filed Jan. 26, 2015, 13 pages.

U.S. Appl. No. 13/034,555, , "Final Office Action received for U.S. Appl. No. 13/034,555, mailed on Jul. 13, 2016", filed Jul. 13, 2016, 17 pages.

U.S. Appl. No. 13/034,555, , "Non-Final Office Action received for U.S. Appl. No. 13/034,555, mailed on Mar. 12, 2014", filed Mar. 12, 2014, 18 pages.

U.S. Appl. No. 13/034,555, , "Non-Final Office Action received for U.S. Appl. No. 13/034,555, mailed on May 23, 2013", filed May 23, 2013, 22 pages.

U.S. Appl. No. 13/034,555, , "Non-Final Office Action received for U.S. Appl. No. 13/034,555, mailed on Oct. 5, 2012", filed Oct. 5, 2012, 11 pages.

U.S. Appl. No. 13/034,555, , "Non-Final Office Action received for U.S. Appl. No. 13/034,555, mailed on Oct. 23, 2015", filed Oct. 23, 2015, 18 pages.

U.S. Appl. No. 13/034,555, , "Notice of Allowance received for U.S. Appl. No. 13/034,555, mailed on Jun. 30, 2017", filed Jun. 30, 2017, 14 pages.

U.S. Appl. No. 15/783,253, , "Final Office Action received for U.S. Appl. No. 15/783,253 , mailed on Oct. 18, 2021", filed Oct. 18, 2021, 21 pages.

U.S. Appl. No. 15/783,253, , "Final Office Action Received for U.S. Appl. No. 15/783,253, mailed on Mar. 19, 2020", filed Mar. 19, 2020, 20 pages.

U.S. Appl. No. 15/783,253, , "Non Final Office Action Received for U.S. Appl. No. 15/783,253 mailed on Mar. 18, 2021", filed Mar. 18, 2021, 19 pages.

U.S. Appl. No. 15/783,253, , "Non-Final Office Action", U.S. Appl. No. 15/783,253, filed Jan. 10, 2023, 5 pages.

U.S. Appl. No. 15/783,253, , "Non-Final Office Action", U.S. Appl. No. 15/783,253, filed Aug. 18, 2022, 7 pages.

U.S. Appl. No. 15/783,253, , "Non-Final Office Action received for U.S. Appl. No. 15/783,253, mailed on Oct. 4, 2019", filed Oct. 4, 2019, 16 pages.

U.S. Appl. No. 15/783,253, , "Notice of Allowance", U.S. Appl. No. 15/783,253, filed Jun. 9, 2023, 10 pages.

Abadi, et al., "Aurora: A New Model and Architecture for Data Stream Management", The VLDB Journal (12)2, Digital Object Identifier (DOI) 10.1007/s00778-003-0095-z, 2003, pp. 120-139.

Al Hasan, et al., "Query Suggestion for E-commerce Sites", Proceedings of the fourth ACM International Conference on Web Search and Data Mining, Feb. 2011, pp. 765-774.

Babcock, et al., "Models and Issues in Data Stream Systems", ACM PODS'02, Jun. 2002, pp. 1-16.

Barga, et al., "Consistent Streaming Through Time: A Vision for Event Stream Processing", 3rd Biennial Conference on Innovative Data Systems Research (CIDR), Jan. 2007, pp. 363-374.

Chaiken, et al., "SCOPE: Easy and Efficient Parallel Processing of Massive Data Sets", Proceedings of the VLDB Endowment, Aug. 2008, pp. 1265-1276.

Chakravarthy, et al., "Composite events for active databases: Semantics, contexts and detection", Proceedings of the 20th VLDB Conference, 1994, pp. 606-617.

Chandrasekaran, et al., "Streaming Queries over Streaming Data", 2002, 12 pages.

Chandrasekaran, et al., "TelegraphCQ: Continuous Dataflow Processing for an Uncertain World+", Proceedings of the 2003 CIDR Conference, 2003, 12 pages.

Chang, et al., "Bigtable: A Distributed Storage System for Structured Data", OSDI '06: 7th USENIX Symposium on Operating Systems Design and Implementation, Nov. 2006, pp. 205-218.

Dean, et al., "MapReduce: Simplified Data Processing on Large Clusters", OSDI '04: 6th Symposium on Operating Systems Design and Implementation, 2004, 23 pages.

Demers, et al., "Cayuga: A General Purpose Event Monitoring System", In CIDR, 2007, 2007, pp. 412-422.

Demers, et al., "Towards Expressive Publish/Subscribe Systems", In Proceedings of the 10th International Conference on Extending Database Technology, Munich, Germany, Mar. 2006, 18 pages.

Diao, et al., "SASE+: An Agile Language for Kleene Closure over Event Streams", UMass Technical Report 07-03, 2007, 13 pages.

Gehani, et al., "Composite event specification in active databases: Model & implementation", Proceedings of the 18th VLDB Conference, 1992, pp. 327-338.

Meo, et al., "Composite events in chimera", Extending Database Technology (EDBT), 1996, 22 pages.

Olston, et al., "Pig Latin: A Not-So-Foreign Language for Data Processing", SIGMOD '08: Proceedings of the 2008 ACM SIGMOD international conference on Management of data, Jun. 2008, pp. 1099-1110.

Rizvi, et al., "Events on the edge", SIGMOD '05: Proceedings of the 2005 ACM SIGMOD international conference on Management of data, 2005, pp. 885-887.

Sadri, et al., "Expressing and Optimizing Sequence Queries in Database Systems", ACM Transactions on Database Systems, vol. 29, No. 2, Jun. 2004, 37 pages.

Seshadri, et al., "The design and implementation of a sequence database system", Proceedings of the 22nd VLDB Conference, 1996, pp. 99-110.

(56) References Cited

OTHER PUBLICATIONS

Tucker, et al., "Using Punctuation Schemes to Characterize Strategies for Querying over Data Streams", IEEE Transactions On Knowledge And Data Engineering, vol. 19, No. 9, Sep. 2007, pp. 1227-1240.

Wu, et al., "High-Performance Complex Event Processing over Streams", SIGMOD '06: Proceedings of the 2006 ACM SIGMOD international conference on Management of data, Jun. 2006, pp. 407-418.

\* cited by examiner

US 12,130,826 B2

PARALLEL DATA STREAM PROCESSING SYSTEM

RELATED APPLICATION

This application is a continuation of and claims priority to U.S. patent application Ser. No. 15/783,253, filed Oct. 13, 2017, entitled "PARALLEL DATA STREAM PROCESSING SYSTEM", which claims priority from U.S. Provisional patent application Ser. No. 13/034,555, filed Feb. 24, 2011, which claims priority from U.S. Provisional Patent Application Ser. No. 61/308,877, filed Feb. 26, 2010, each of which is hereby incorporated by reference in its entirety.

TECHNICAL FIELD

This application relates to a method and system for processing a stream of data in parallel.

BACKGROUND

Internet companies generate and store large amount of stream (time stamped and ordered) data. Search engine companies and ecommerce companies typically record searches, clicks and other user activity and system activity. Analysis of this voluminous data can be challenging as it requires large processing resources.

Analysis involves partitioning the data into some logical sub-streams (grouping and ordering), detection and extraction of event patterns. The size of data sets further dictates robust solutions. Such database products available are prohibitively expensive. Programmers access data by various means and use custom code to perform above mentioned tasks.

BRIEF DESCRIPTION OF THE DRAWINGS

The present invention is illustrated by way of example, and not by way of limitation, in the figures of the accompanying drawings in which.

DETAILED DESCRIPTION

Figure 1:
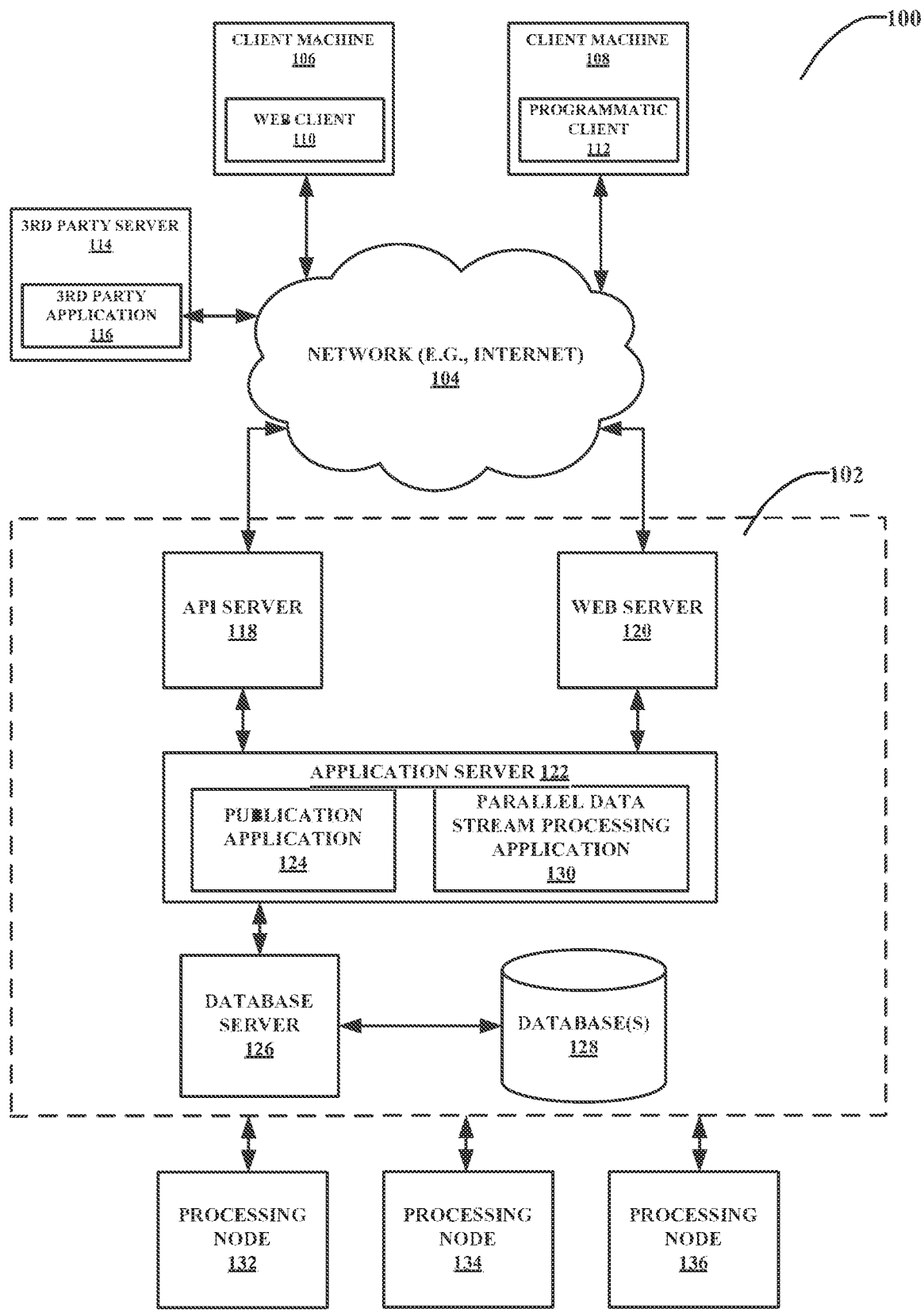
FIG. 1 is a network diagram depicting a network system, according to one embodiment, having a client-server architecture configured for exchanging data over a network.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system process a stream of data in parallel across a plurality of nodes. The log processing system has a log module, a query language module, and a scalable query processing module. The log module receives and organizes the stream of data into a sequential and nested data structure. The query language operator module defines operators that operate on the sequential and nested data structures. In one embodiment, the query language referred to as Mobius Query Language (MQL) is a SQL like query language based on the nested data model with representation for sequence data. The scalable query processing module processes in parallel across a plurality of nodes a query based on an operator on the stream of data.

Analysis requires partitioning the data into some logical sub-streams (grouping and ordering), detection and extraction of event patterns. More specifically 'event1 caused event2' is represented by a pattern with context condition. The size of the data sets dictates highly parallel and robust solutions. Parallel database products available are prohibitively expensive. And hence programmers access data by various means and use custom code to perform above mentioned tasks.

MapReduce framework provides with two high level primitives, map and reduce for parallelism. Data is considered as list of unordered atomic data unit pair, called (key,value) pairs. Atomic unit can be a character, a word, a line, a paragraph or any generic type. A user coded map function processes each (key,value) pair to generate an unordered list of (key,value) pair. Another user written function, reduce merges all values for a given key generated by all mappers. Tasks expressible in MapReduce framework, requires writing of map and reduce function. Hence, leading to a code base, which is hard to reuse and maintain. Strict nature of framework makes it difficult for end user optimizations. Other languages (e.g., PIG, Hive, SCOPE, HadoopDB and DryadLINQ solve this problem by providing with a high level language, implemented on Hadoop. In addition, a functionality to plug in user defined functions is also provided. All such languages provide relief to programmers from not dealing with low level functionality of map-reduce. Since the languages mentioned above deal with sequential queries, queries using the sequential nature of the data. For example a pattern query is a sequential query. Hence, users are forced to write sequential part of the analysis as user defined functions (if possible). But still a great quantity of code base is generated as user defined functions, which will not be reused or optimized. Some of the previous languages work with flat data model and hence sequence compare operators will be modeled as self joins which will be prohibitively slow.

There has been extensive research in stream processing. However, all such stream processing systems are designed for online event pattern extraction. They are not designed for offline ad-hoc sequence analysis. Support for nested data model is missing. Nested data model helps in making UDFs more powerful, make the language algebraic and enable users to group without aggregation. By making these complex group tuples as basic unit of data parallelism (i.e. parallelizing paradigm ensures that this complex tuple remains at same machine) complex correlated operators like sequence operators can be parallelized. Although distributed XQuery languages like DXQ, XQueryD extends XQuery to support distributed computing by allowing arbitrary queries to be sent to remote servers for remote execution, all of the previously mentioned approaches do not have parallel implementations. Some of the languages support distributed sources and distributed query plan where queries are pushed closer to the sources and partial results are returned. But join operator and queries which compile in to more than one distribute and collect phase are time heavy.

In contrast, the present log processing system allows for allows for both relational and sequence operators to be used together. MQL provides automatic parallel execution for sequence and relational queries. This makes the system extremely easy to use. MQL provides for a calable ad-hoc log processing system as all queries are compiled to map-reduce jobs. Nested data model for sequence query system.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning specifically to the network-based publisher 102, an application program interface (API) server 118 and a web server 120 are coupled to, and provide programmatic and web interfaces respectively to, one or more application servers 122. The application servers 122 host one or more applications (a publication application 124 and a parallel data stream processing application 130). The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application 124 may provide a number of publisher functions and services (e.g., listing, payment, etc.) to users that access the network-based publisher 102. For example, the publication application 124 may provide a number of services and functions to users for listing goods and/or services for sale, facilitating transactions, and reviewing and providing feedback about transactions and associated users. Additionally, the publication application 124 may track and store data and metadata relating to financial transactions among users of the network-based publisher 102.

A third party application 116 may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The parallel data stream processing application 130 logs the users online various activities (e.g. browsing, bidding, viewing, searching, among others) in a time sequence manner. Furthermore, the parallel data stream processing application 130 is capable of processing queries on the data stream in parallel across several processing nodes (e.g. physical or virtual computing devices).

Figure 2:
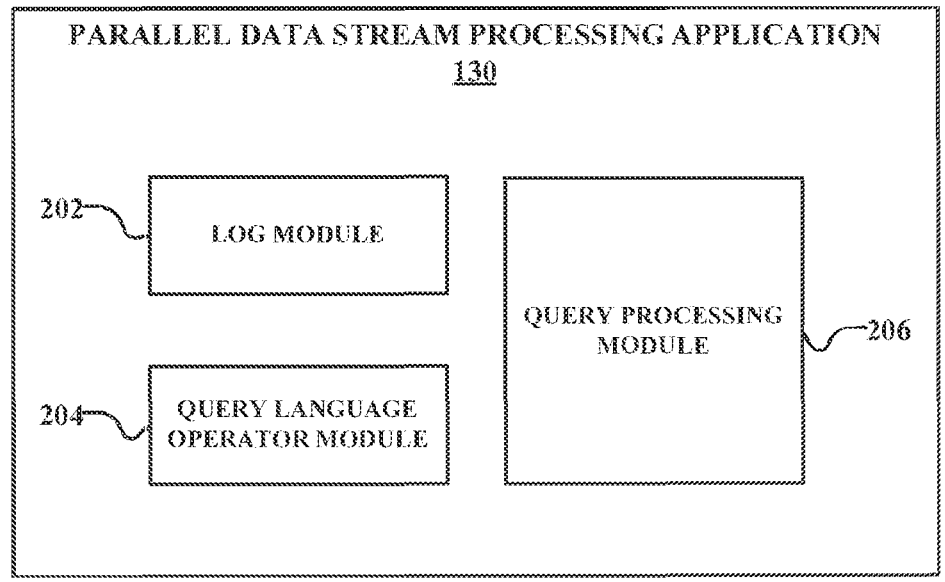
FIG. 2 is a block diagram illustrating an example embodiment of a parallel data stream processing application.

FIG. 2 is a block diagram illustrating an example embodiment of the parallel data stream processing application 130. The parallel data stream processing application 130 has a log module 202, a query language operator module 204, and a query processing module 206. The log module 202 receives and organizes a stream of data into a sequential and nested data structure. The query language operator module 204 defines operators that operate on the sequential and nested data structure. The query processing module 206 processes in parallel across a plurality of nodes a query based on an operator on the stream of data. Details of the operation of each module are further described below.

Figure 3:
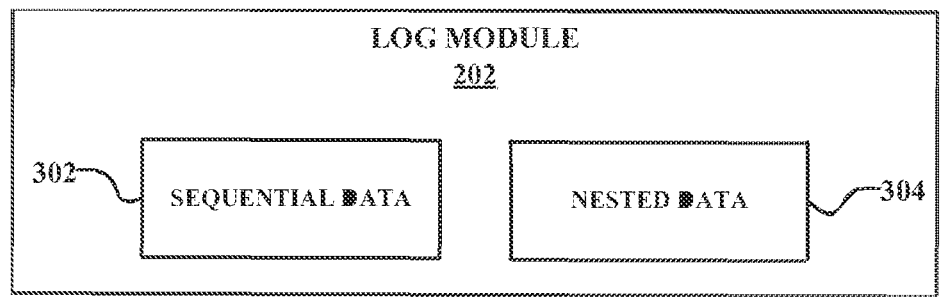
FIG. 3 is a block diagram illustrating an example embodiment of a log module.

FIG. 3 is a block diagram illustrating an example embodiment of the log module 202. The log module 202 receives a stream of data and organizes it into sequential data 302 and nested data 304. MQL data model contains the following data types: atom, tuples, maps and bags.

An Atom is a simple atomic value like integer, date, string. E.g. 'eBay', '100'.

A Tuple is a sequence of any data type. This allows for the nested nature in the data model. E.g., ('10','alice').

A Map is a collection of (key; value) pairs. In one embodiment, MQL only allows keys to be of atomic type. Map is useful to model data set where schemas might change over time. E.g. ['total'→'alice']

A Bag is defined as collection of tuples. There are two types of bags, ordered and unordered. Data streams of semistructured data can easily be modeled as ordered bags. E.g., {('eBay'; 2000), ('PayPal'; 1000)}

In MQL, bags can be ordered bags (representing the sequence data) or unordered bag. Various sequence operators can applied on ordered bags.

Relations can be seen as the collection of tuples represented by the bags. Sequence data is the collection of tuples ordered by a total order (for e.g. time). Hence sequence data is represented by the ordered bags. Relations are traversed in arbitrary order but sequence data is traversed in the order defined by the sequence. Sequence data is a snapshot of a stream (or a window). User activity logs are a collection of different sessions which contain all the activity for that session ordered by time. Each session is modeled as an ordered bag identified by a session id. Logs are represented by an unordered bag of (guid, sessionid, session), where session is the activity sequence only for the guid.

The following table illustrates examples of expression in MQL of a tuple T. Tuple t contains three fields or columns: the first is an atom (a string). The second is a map with a string 'total' mapping to integer 3000. The third is a bag with 2 tuples.

--- t = ('erl', ['total → 3000], {('ebay', 2000), ('PayPal', 1000)})
Let fields of t be called f1, f2, f3.
f1 is an atom, f2 is a map and
f3 is an ordered bag ordered by $1.

| Expression Type | Example | Value for t |
|---|---|---|
| Constant | 'mobius' | Independent of t |
| Field by position | $0 | 'erl' |
| Field by name | f1 | 'erl' |
| Map lookup | f2#['total'] | 3000 |
| Functional Evaluation | AVG(f3.$1) | 1500 |
| Flattening | FLATTEN([f3]) | ('eBay',2000) ('PayPal', 1000) |
| By index in ord. bag | IDX([f3],1) | (PayPal,1000) |
| Inner Query | SELECT $0, $1 FROM f3 WHERE $1 > 1500 | {('eBay',2000)} |

---

Figure 4:
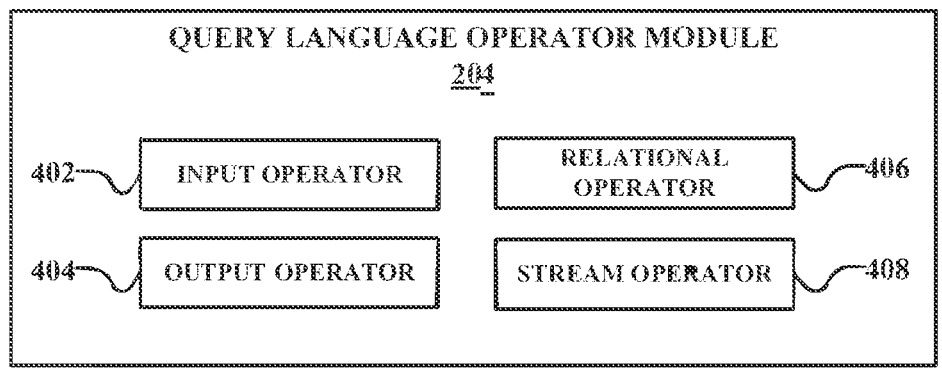
FIG. 4 is a block diagram illustrating an example of a query language operator module.

FIG. 4 is a block diagram illustrating an example of the query language operator module 204. An MQL query is an expression (operator) that takes in a collection of tuples (bag) as input and returns a collection of tuples(bag) as output. The term "bag" and "collection of tuples" may be used interchangeably. (This definition applies to all the query statements except LOAD and SAVE.) The resultant collection may be an empty collection. MQL is based on a collection algebra that is closed under all MQL operators. Thus, MQL queries provide closure—all operators take in a collection of tuples and return a collection of tuples. The resultant collection can be the source for another MQL query.

The query language operator module 204 has an input operator 402, an output operator 404, a relationship operator 406, and a stream operator 408.

The Input Operator 402 includes for example a LOAD statement that reads data from the data source (say, file system). MQL allows for customizable (user defined) file reader. MQL can load delimited files as bag of tuples. By default delimiters are set to whitespaces. User can specify any delimiter she wants (comma, tab or newline). User has the option of providing the schema for tuple by AS keyword in load command.

One typical use case is analysis of the user session logs. MQL provides a mechanism for loading session logs by just providing the date range. userlogs is an ordered bag of user browsing activity. Each tuple represent activity by the user. It can be search, bid, viewitem (that is viewing an item page listed on site) etc:

DATASET data=LOAD 'logs.txt' AS (time,price);
DATASET userlogs=LOAD '2009/10/1-2009/15/1';

The Output Operator 404 includes for example a SAVE statement writes data to a data sink (say, file system). MQL provides functionality for saving bags and other data on to the disk by a single command SAVE. By default bags and tuples are serialized into strings and those strings are stored on to the disk. MQL also supports delimited storing of the bags:

SAVE userlogs INTO 'dump.txt' USING MQLSTORE( );

In both the load and save commands, user can specify the custom loader and saver by using the keywords 'USING'.

The Relational Operator 406 includes queries that process data using relational operators like select, project and join etc. Relational operators operate on relations and output relations or streams.

An example of a relational operator 406 is a group and join query. The group operator groups together tuples into nested bags. More explicitly, each group is represented by a single tuple containing group name and bags, one for each source. MQL also provides mechanism for ordering tuples belonging to the same group by using keyword 'ORDERING'.

Each nested bag contains tuples belonging to the group from the same source. Since each group is represented by a tuple containing nested bags, it is easy to iterate over all groups and run a query on each group. The parallelism is on the tuple level as a single node contains the whole tuple i.e. the whole group. This provides a straight forward mechanism for implementing correlated queries including sequence queries on a group in a parallel manner, hence making processing of large datasets possible. The following is an example of a group query:

userlogs:(guid,pagename,time,url,data) contains all the user logs. User session is defined as all the events done by a single guid.

--- sessionlogs =
    SELECT groupid AS guid, userlogs AS session
    FROM userlogs
    GROUP userlogs BY guid ORDERING time

---

The above query will generate sessionlogs:(guid,session) where session is an ordered bag, ordered by time. In the above example, the tuples are ordered belonging to the group by using keyword ORDERING. In the group-tuple, the keyword groupid is used to denote the value on which the grouping is done. Name for this field is not reused from source as different sources might have different names for this attribute. Source name is used for inner bag containing all the tuples belonging to this group. A group can be seen as filtering different sub-streams into different buckets based on the grouping criteria. A group operator followed by a flatten operator is equivalent to a SQL 'join' operator. Hence we have not kept 'join' in the language.

The following is another example where the dataset userlogs contains the browsing activity and let dataset userdata:(guid,rating) be data for every user. Query for grouping the userlogs and userdata on guid is written as:

```
userlogdata =
    SELECT group id AS guid,
        userlogs AS logs, userdata AS data
    FROM userlogs, userdata
    GROUP userlogs BY guid ORDERING time,
        ALSO userdata BY guid
```

The following is another example where given dataset userlogs the objective is to calculate the number of activity done by each user:

```
activitycount =
    SELECT groupid AS guid, count(userlogs)
    FROM userlogs
    GROUP userlogs by guid
```

The relational operator 406 includes select and project operators. Selection of tuple from the input bag is done by the where condition, start condition and stop condition. A condition predicate is defined by the comparison operator between two expressions when the expressions are evaluated to atoms. Due to nested data model MQL also has conditions which are evaluated on bags. These conditions can be used to filter sub-streams. EXISTS and FORALL are such predicates.

Projection is performed by the expressions contained in select expressions present in every MQL query. Expressions such as field reference are provided in MQL. Other expressions such as function evaluation, flattening (unnesting) of the bag field, selection of a tuple from a bag field are also present in MQL. MQL also provides for inner queries implemented on a bag field. Select list is the list of expressions to be contained in the output tuple.

The following is an example where the task is to find the sessions with at least k search activity. This task could be performed as:

```
Ksearchsessions =    SELECT guid, session
                     FROM sessionlogs
                     WHERE SIZE({
                        SELECT *
                        FROM session
                        WHERE pagename = "search"
                     }) >= k
```

The Stream Operator 408 includes queries that process streams to generate streams or relations. Examples of stream operators include start and end sequence operator and pattern query.

MQL provides for start and end operator which are stream operators as they are applied only on the stream and generates a stream as an output. The output stream from the start operator begins when the condition described in the operator is satisfied. Similarly the stream is chopped off when the condition in the stop operator is satisfied. These operators provide a way to filter whole or part of stream which is uninteresting for the user.

The dataset contains collection user browsing session streams. The task is to find all the user activity after her search generated no results. This task could be done as:

```
emptysearch_sessions =
    SELECT guid, {
        SELECT *
        FROM session
        START (pagename == "search")
            && (search_size == 0)
    } AS emptysearchsession
    FROM sessionlogs
```

The expressive power of MQL lies in combining the SQL like operators and pattern matching. The group and select extract subsequences from a big data source. A pattern query is used for event pattern matching on those sub-sequences.

Events are modeled as tuples in MQL. An event pattern is defined as the template that matches a set of contiguous events. The template describes the order dependencies (order in which the events occur) in the pattern. It also describes the selection criteria for the events based on their field values. These conditions are called data parameter conditions. Context of the pattern is defined as all the events from the start of the event pattern to the end of event pattern. The context also contains information about how the event-pattern is broken down into each pattern part. MQL allows for writing specific conditions on the context. The timing condition described in the event-pattern is the condition which every set of events matching the event pattern should satisfy. These conditions are outside the scope of data parameter and context conditions. A simple case of timing condition is a condition stating that all set of events satisfying the event-pattern should start after 10:00 AM. Hence pattern operator comprises of three parts order dependencies, data parameter conditions and context conditions.

The identifier // is used to denote following event. The identifier // is used for giving the order dependencies. A pattern structure is defined using various conditions (predicates) and the order dependencies. Segments with fixed length are represented in MQL using ^. In MQL Kleene® (Kleene closure) and Kleene+ are used to describe segments with unknown sizes. The condition for acceptance of events in a pattern part is the data parameter conditions described above. These conditions are also known as uncorrelated conditions:

```
pattern = pattern +
        | pattern *
        | pattern AS ALIAS
        | pattern //pattern
        | condition
```

Any subpart of the pattern can be named using the AS clause. The parts with more than one events are named as bags using [ ] after the variable name. Segments with unknown length with no data parameter conditions are represented by '**'.

Pattern query may also contain a WITH clause which provides a mechanism to express conditions on the context of the pattern. Naming of various parts of the pattern helps in expressing context conditions. The timing conditions on the event-pattern are given by the START and END operators.

Patterns are defined for contiguous set of events. Given an event choosing which part of the pattern it belongs to can be a non-deterministic proposition. Due to presence of Kleene® and Kleene+ events might match with current part and the next part in the pattern. The state machine can chose to continue the existing part or start the next part or branch out new patterns and continue all possibilities. The operation mode is taken as an input from the user. By default, priority is given to match the next part of the pattern. User can specify to follow all possible options that are possible to extend a partial pattern. This can be described by using keyword 'ALL' in pattern structure.

In the following example (Example A), the task is to find all search events which caused a viewitem event by click on the result in a search page. The input dataset is sessionlogs: (guid,session). The pattern query is described below:

```
sessions_searches =
    SELECT guid, {
        SELECT s AS search, v AS view
        FROM session
        PATTERN (pagename == "search" AS s //
            pagename == "viewitem" AS v)
        WITH v.itemid IN s.resultset
    } AS searches
    FROM sessionlogs
    WHERE exists:session(pagename == "search")
```

The dataset sessions_searches:(guid,searches) generated by the query in the previous example contains a bag field named searches which is generated by the inner query which is run on the field named session of the input tuple. The bag searches contains tuples of (search-event,view-event). In the above example the data parameter conditions and order dependencies are provided in the PATTERN clause. The data parameter conditions forces the first event to be a search event and the second event to be a view event. The order dependencies forces search event should be followed by a view event. The context condition forces causal nature between the view event and the search event. This is achieved by forcing the item seen in the view event as one of the items shown as a result on the search event.

In the following example, the input dataset for this example is sessionlogs:bag(guid,session) which contains the collection of session tuple. The task is to extract all the sessions in which a search-event caused a bid-event:

```
searchbidsessions =
    SELECT guid, session
    FROM sessionlogs
    WHERE size({
        SELECT s,m,b
        FROM session
        PATTERN (pagename == "search" AS s //
            ** AS m[ ]//
            pagename == "bidpage" AS b)
        WITH (b.itemid IN s.resultset) and
            (m[i].pagename != "search" or
            b.itemid NOTIN m[i].resultset)
    }) > 0
```

MQL does not restrict the boundary of a pattern inside a window. The windows are defined by the number of events or a time period. In MQL due to parallel implementations window is the amount of log loaded. Hence all the patterns may stretch to the boundaries of the logs loaded in the system.

Figure 5:
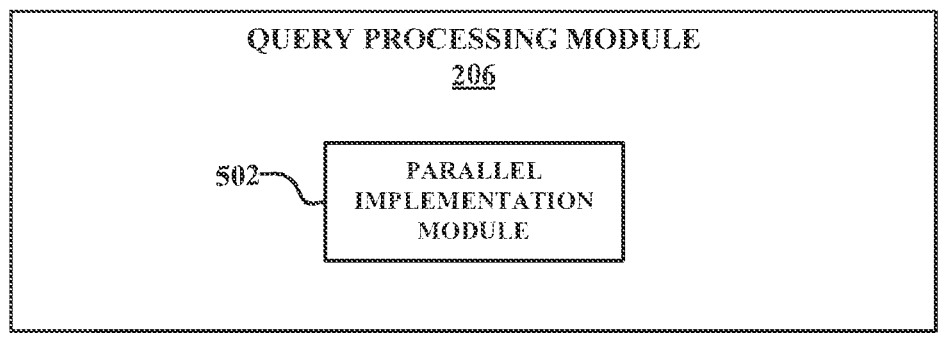
FIG. 5 is a block diagram illustrating an example of a query processing module.

FIG. 5 is a block diagram illustrating an example of a query processing module 206. The query processing module 206 includes a parallel implementation module 502. Nested data model allow users to group the data without aggregation. This makes the single unit of parallelism more complex compared to a simple flat tuple. For example users can group the user activity log by global unique identifier (guid) and perform any custom processing on every such group. That is the parallelism unit becomes user activity of a single guid rather than an activity event.

Given the data source which is a collection of tuples, Mobius system splits the collection arbitrarily into small pieces but never splitting the tuple itself. Then it performs the required transformations to generate the output set (hence achieving data parallelism). Availability of nested tuples as basic unit of parallelism is the key to achieving parallel implementation of sequence operators. Users can group (split) the sequence data into various sub-sequences (e.g. user logs by guides, session-id etc.). The parallel implementation module 502 performs sequence operation on subsequence in parallel. None of the subsequences are split and operation on the subsequence can be performed in parallel.

MQL is implemented using the parallel implementation module 502. One embodiment of an implementation uses Hadoop, an open source, scalable, fault tolerant implementation of map-reduce framework. The following illustrates how Mobius builds the logical plan for queries, using basic operator.

As the MQL query script is submitted to the system, the MQL interpreter first parses it, and verifies the input files and bags and data being referred to be of right type. Consider the dataset logs:(atom; atom; map) which was grouped into a nested bag userlogs:(atom; session:bag(atom; atom; map)). For example the expression using session as a bag is a valid expression where expression using session as atom is invalid. The query plan for a single query is generated as a directed acyclic graph, where each node is an operator defined earlier. The plan for the queries is joined together if one bag generated by one query is being used as an input to the other.

No processing is done until a store operator is seen. This allows us to combine various operators into one map-reduce task. The logical plan construction is independent of Hadoop execution layer. This allows for early detection of errors.

Figure 8:
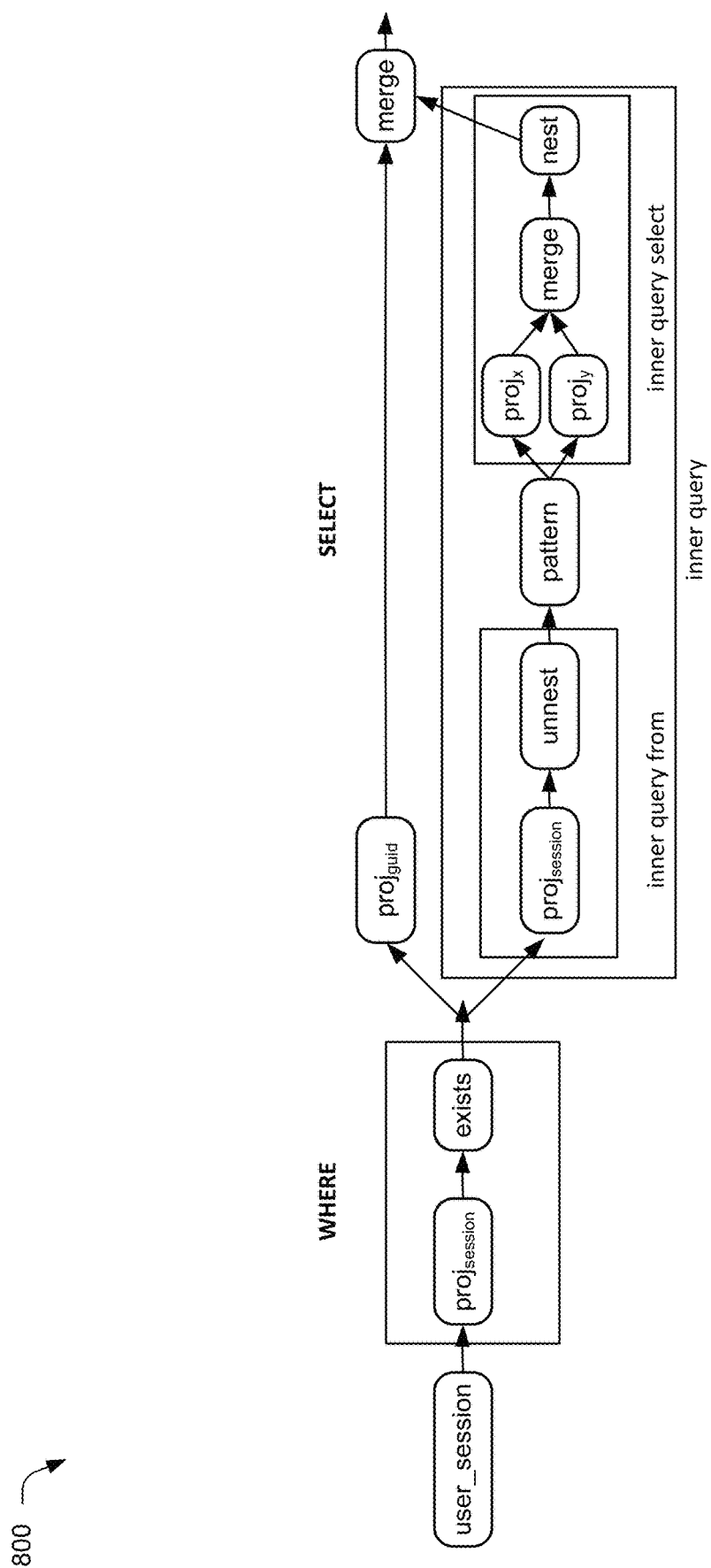
FIG. 8 is a block diagram illustrating an example of a logical plan for a query.

The query in Example A above is translated to a logical plan in FIG. 8. The logical plan for the entire query can be seen as three operators—from, where, select. The logical plan of where and select are hidden in these meta-operator. For every tuple from the source the internal plan of where (and select) is independent. That is the logical plan can be executed in parallel for two different tuples from the source.

Figure 9:
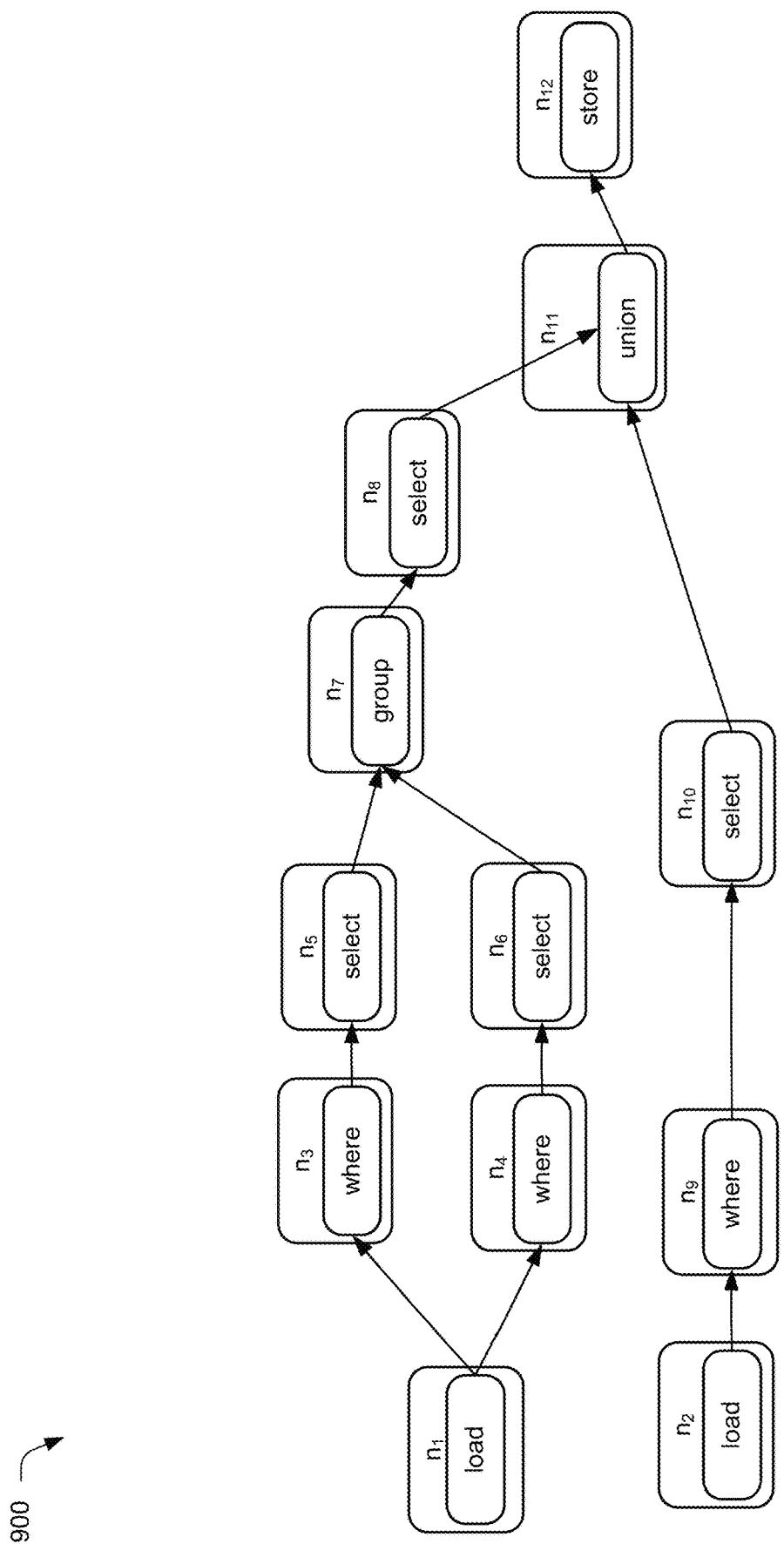
FIG. 9 is a block diagram illustrating an example of a query plan for a batch job.

The queries chained together from load to store are converted to a DAG as shown above on these nodes. One example is given in FIG. 9. If the loader is loading substreams then any select or where operator could have a pattern query as an inner query. The sub-streams can also be generated by using a group operator.

The map-reduce primitive essentially sorts the keys and group all the values for the same key; it provides the ability to do a large-scale grouping. The reducer processes groups defined by the key, hence it provides a natural method of pushing other operators inside reduce.

This provides twofold benefits. First, this minimizes the number of map-reduce task to a bare minimum. Second, as interface between two map-reduce task is through files in hadoop distributed file system, by adding operators in reduce it may reduce the file size to be written, hence providing increased performance.

The datasets are bags of tuples which may have complex fields (example bags). User can write inner queries for complex fields. These inner queries are executed for every outer tuple on the value of the complex field contained inside it. Mobius ensures that the outer tuple is never distributed across mappers.

The operators which have more than one input or which rearrange the tuples require a reduce phase in them. This is because the data which the above operator needs together to operate on is distributed over various mappers. Simplest example is the group operator. The group operator needs all the tuples with the same grouping key to be available at the same time. The reduce phase brings together all the data required at a time to a single place. Group, join, union, sort operator require a reduce phase.

For a store operator a DAG is produced which corresponds to the query plan to generate the dataset for store. In this DAG load are the only nodes with zero indegree and store is the only node with zero out-degree. This DAG induces a partial order on the nodes. The partial order induced is defined as follows: node u £v if there is a path from u to v; otherwise, they are incomparable. All the nodes n1, n2 . . . nk which require a reduce phase are sorted according to the partial order; such that node ni appears before nj if ni is incomparable to nj or ni<=nj. Nodes are considered in this order. For every node ni a query plan DAG is induced by keeping all nodes which are less than ni (i.e. keeping all the nodes which can reach ni). This subgraph is the execution plan for the mapper. The original DAG is traversed from the ni along the edges until a node nm is reached with more than one out-degree. When that node is reached the linear chain from the node ni to node nm (or store) is the execution plan of reducer. This forms a single map-reduce phase. Before considering the next node all the occurrence of the operator nm (which was last operator in reduce phase) is replaced by a load of the partial results. And all edges into nm are removed.

More than one input data is handled by appending an extra pseudo field to tuple which identifies the source of the tuple. In the reducer different sources are put into different bags. Parallelism for load is obtained as data is stored in file splits in HDFS. Parallelism for select and project are also straightforward as many instances of map and reduce functions are running simultaneously. Parallelism for group, both in single and multiple source case, is achieved since multiple map instances split their output data to send to the multiple reduce instances.

The pattern queries done on the outer level are forced to use one mapper. Hence the parallelism is lost when sequence operators are applied on the outer bags. But sequence operators can be applied in parallel on complex field of the outer tuple. The generation of those complex tuple is also done by a parallel group operator. According to our experience pattern queries are performed on a subsequence. For example in case of user activity logs session analysis is equivalent to pattern queries on sequence data when grouped by a user.

Figure 6:
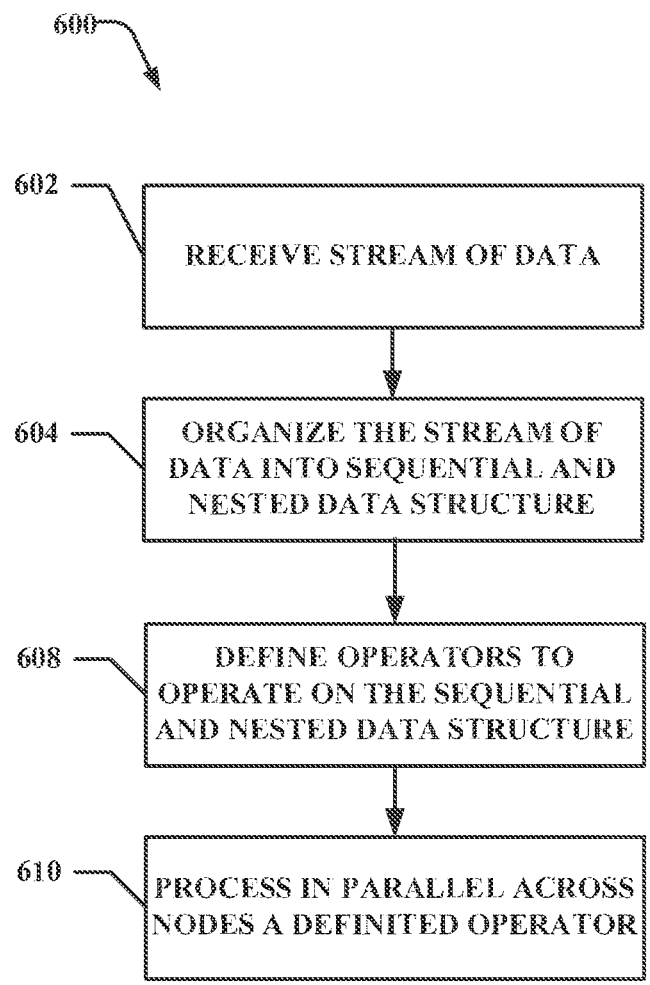
FIG. 6 is a flow chart of an example method for parallel processing of a data stream.

FIG. 6 is a flow chart of an example method for parallel processing of a data stream. At 602, a stream of data is received. At 604, the stream of data is organized into sequential and nested data structures. At 608, operators are defined to operate on the sequential and nested data structure. At 610, a query based on one of the defined operators is processed in parallel across several nodes.

Figure 7:
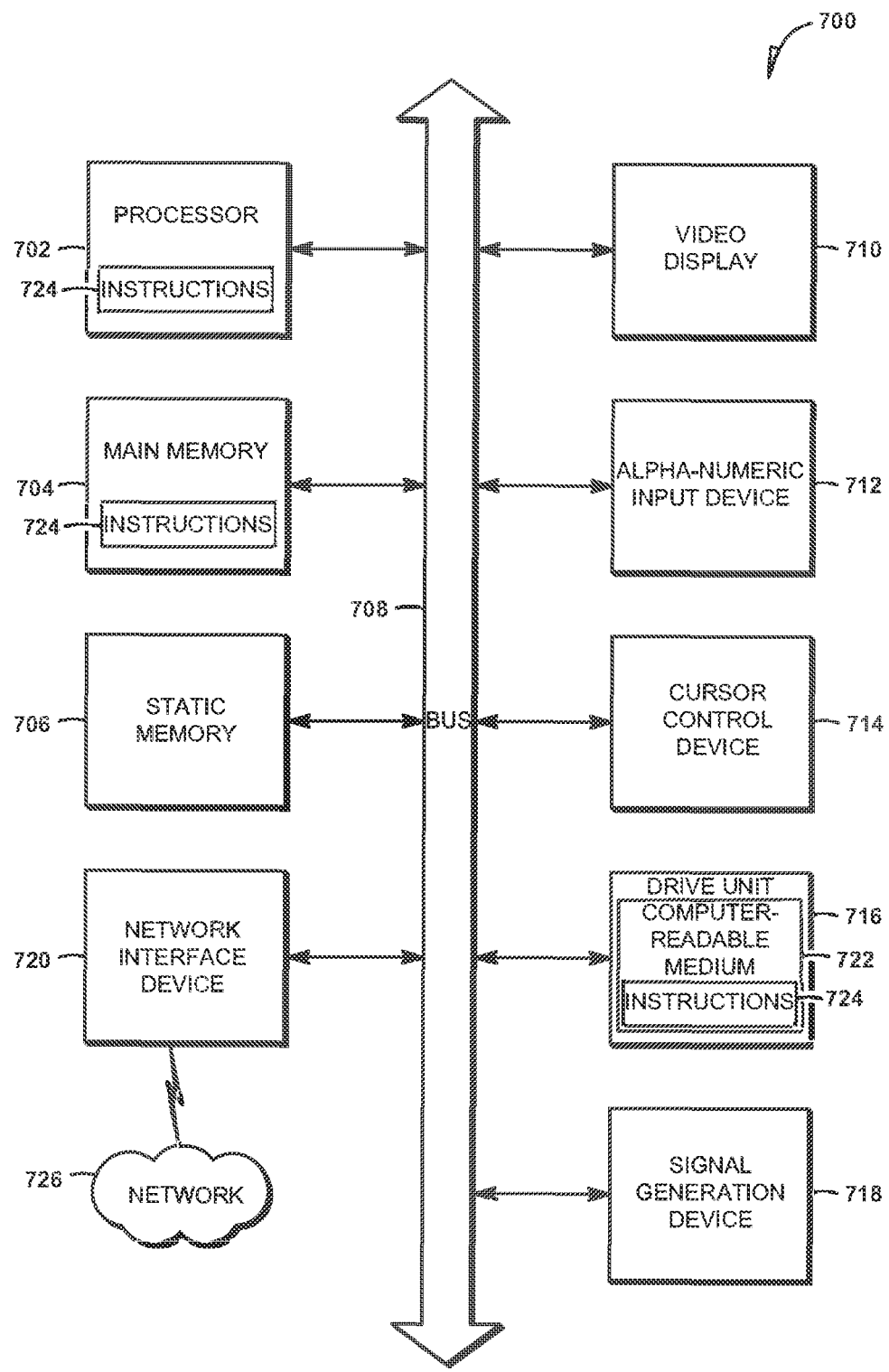
FIG. 7 shows a diagrammatic representation of machine in the example form of a computer system within which a set of instructions may be executed to cause the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computing system, comprising:
one or more processors; and
a machine-readable medium having instructions stored which, when executed by the one or more processors, cause the computing system to:
organize a stream of data into a sequential data structure and nested data structure;
define a relational operator and a sequential operator that both operate in parallel on the sequential data structure and the nested data structure;
split a collection of tuples from the stream of data into a plurality of sub-streams of the data without splitting individual tuples of the collection of tuples;
extract subsequences that match an event pattern by processing the plurality of sub-streams via parallel operations of the relational operator and the sequential operator, in which the event pattern is defined as a template matching a set of contiguous events; and
provide the subsequences that match the event pattern.

2. The computing system of claim 1 wherein the nested data structure includes an atom, a tuple, a map, and a bag, wherein the atom includes a single value, wherein the tuple includes a sequence of atoms, wherein the map includes a collection of key and value pairs, and wherein the bag includes the collection of tuples.

3. The computing system of claim 2 wherein the sequential data structure comprises an ordered plurality of tuples.

4. The computing system of claim 2 wherein the stream of data comprises user activity logs.

5. The computing system of claim 4 wherein the user activity logs include a plurality of sessions, in which each session includes a plurality of activities ordered by time, and in which each session represented as an ordered bag is identified by a session identifier.

6. The computing system of claim 1 wherein a sub-stream of data comprises a nestled tuple, wherein the stream of data is grouped into subsequences.

7. The computing system of claim 1 wherein the template describes order dependencies in the event pattern.

8. A computer-implemented method, comprising:
organizing a stream of data in a sequential data structure and a nested data structure;
defining a relational operator and a sequential operator that both operate in parallel on the sequential data structure and the nested data structure;
receiving a query related to the stream of data;
splitting a collection of tuples from the stream of data into a plurality of sub-streams of the data without splitting individual tuples of the collection of tuples;
extracting subsequences that match an event pattern by processing the plurality of sub-streams via parallel operations of the relational operator and the sequential operator, in which the event pattern is defined as a template matching a set of contiguous events; and
providing the subsequences that match the event pattern.

9. The computer-implemented method of claim 8 wherein the nested data structure comprises an atom, a tuple, a map, and a bag, wherein the atom includes a single value, wherein the tuple includes a sequence of atoms, wherein the map includes a collection of key and value pairs, wherein the bag includes the collection of tuples.

10. The computer-implemented method of claim 8 wherein the sequential data structure comprises an ordered plurality of tuples.

11. The computer-implemented method of claim 8 wherein the stream of data comprises user activity logs, the user activity logs comprising a plurality of sessions, each session comprising a plurality of activities ordered by time, each session represented as an ordered bag identified by a session identifier.

12. The computer-implemented method of claim 8 wherein a sub-stream of data comprises a nestled tuple, wherein the stream of data is grouped into subsequences.

13. A non-transitory computer-readable storage medium storing a set of instructions that, when executed by a processor, cause the processor to perform operations, comprising:
organizing a stream of data in a sequential data structure and a nested data structure;
defining a relational operator and a sequential operator that both operate in parallel on the sequential data structure and the nested data structure;
receiving a query related to the stream of data;
splitting a collection of tuples from the stream of data into a plurality of sub-streams of the data without splitting individual tuples of the collection of tuples;
extracting subsequences that match an event pattern by processing the plurality of sub-streams via parallel operations of the relational operator and the sequential operator, in which the event pattern is defined as a template matching a set of contiguous events; and
providing the subsequences that match the event pattern.

14. The non-transitory computer-readable storage medium of claim 13 wherein the nested data structure includes an atom, a tuple, a map, and a bag, wherein the atom includes a single value, wherein the tuple includes a sequence of atoms, wherein the map includes a collection of key and value pairs, and wherein the bag includes the collection of tuples.

15. The non-transitory computer-readable storage medium of claim 14 wherein the sequential data structure comprises an ordered plurality of tuples.

16. The non-transitory computer-readable storage medium of claim 14 wherein the stream of data comprises user activity logs.

17. The non-transitory computer-readable storage medium of claim 16 wherein the user activity logs include a plurality of sessions, in which each session includes a plurality of activities ordered by time, and in which each session represented as an ordered bag is identified by a session identifier.

18. The non-transitory computer-readable storage medium of claim 13 wherein a sub-stream of data comprises a nestled tuple, wherein the stream of data is grouped into subsequences.

19. The non-transitory computer-readable storage medium of claim 13 wherein the relational operator is configured to operate on the sequential data structure and the nested data structure based on relation conditions, the relational operator including a filter operator, a project operator, a group operator, a join operator, an order operator, a split operator, and a union operator, wherein a stream operator is configured to operate on the sequential data structure and the nested data structure to generate streams that match a pattern, the stream operator including a start operator, a stop operator, and a pattern operator.

20. The non-transitory computer-readable storage medium of claim 13 wherein the template describes order dependencies in the event pattern.

* * * * *